United States Patent
Leitenberger

[11] 3,744,513
[45] July 10, 1973

[54] BRAKE FLUID TANK FOR A HYDRAULIC BRAKE SYSTEM

[75] Inventor: Lothar Leitenberger, Kornwestheim, Germany

[73] Assignee: Daimler-Benz AG, Kornwestheim, Germany

[22] Filed: June 4, 1971

[21] Appl. No.: 150,066

[30] Foreign Application Priority Data
June 5, 1970   Germany.................. P 20 27 712.7

[52] U.S. Cl................ 137/255, 60/54.6 E, 137/265
[51] Int. Cl............................................. F15b 7/08
[58] Field of Search.................... 137/265, 262, 255; 60/54.6 E, 54.5 E

[56] References Cited
UNITED STATES PATENTS

| | | | |
|---|---|---|---|
| 3,542,055 | 11/1970 | Belart | 137/255 |
| 297,221 | 4/1884 | Bergen | 137/255 X |
| 858,602 | 7/1907 | Hopkins | 137/262 X |
| 2,320,913 | 6/1943 | Growell | 137/265 |

*Primary Examiner*—Henry T. Klinksiek
*Assistant Examiner*—Robert J. Miller
*Attorney*—Craig, Antonelli & Hill

[57] ABSTRACT

A supply reservoir for brake fluids of a hydraulic brake system, especially for vehicles, which includes at least two chambers and in which two adjacent chambers are connected by way of a pipe whose discharge openings are arranged approximately at the height of the minimum permissive fluid level in the chambers and at such a distance from the partition wall that the discharge opening projects out of the fluid level in case of an inclination of the fluid level which would be present within the chamber when the minimum permissive fluid level is reached.

22 Claims, 2 Drawing Figures

PATENTED JUL 10 1973  3,744,513
FIG. 1
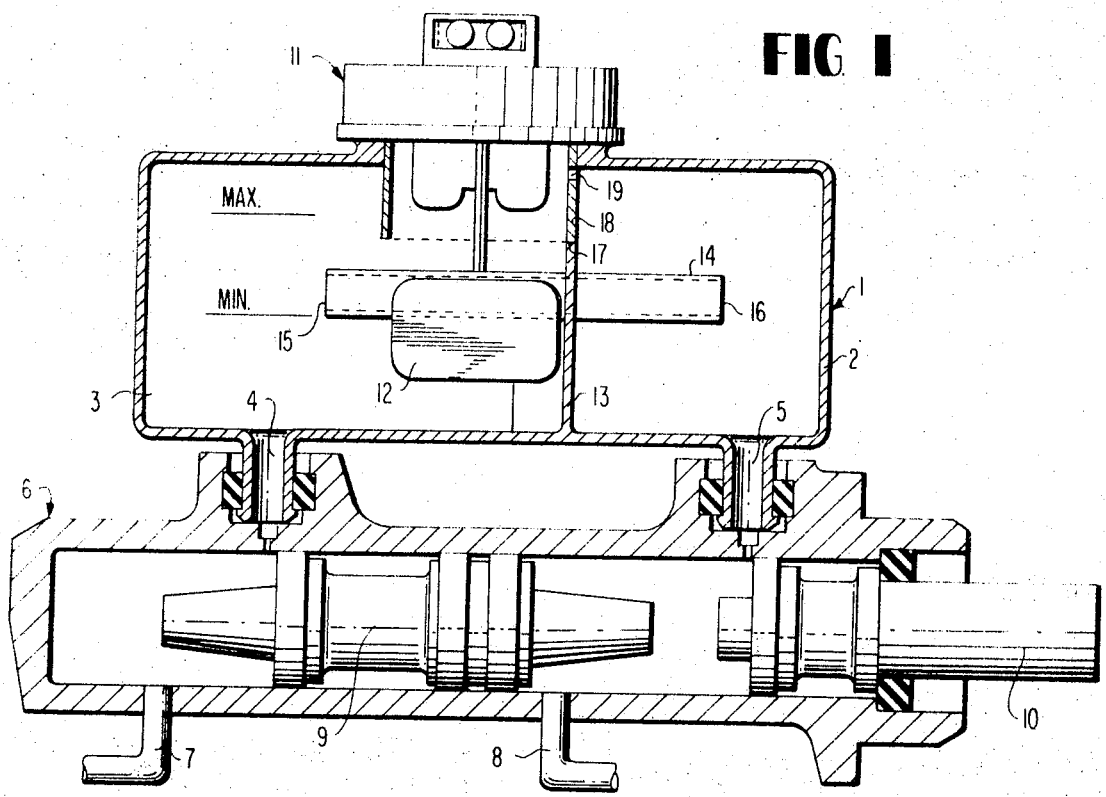
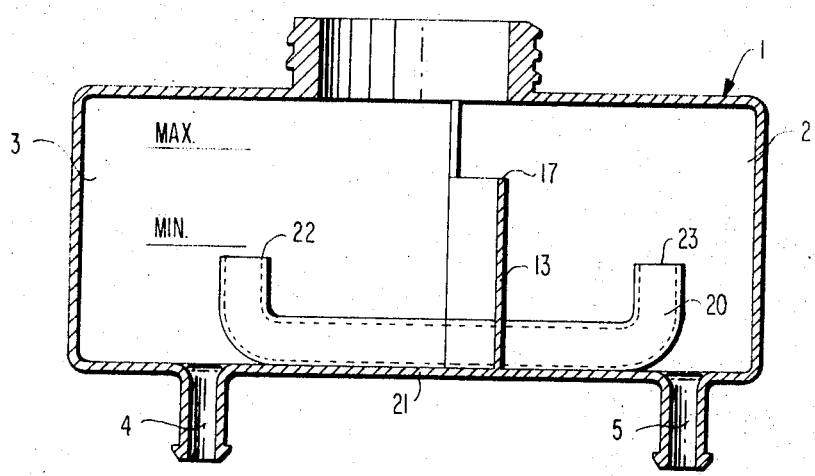
FIG. 2
INVENTOR
LOTHAR LEITENBERGER
BY Craig, Antonelli & Hill
ATTORNEYS

BRAKE FLUID TANK FOR A HYDRAULIC BRAKE SYSTEM

The present invention relates to a supply reservoir for the brake fluid of a hydraulic brake installation, especially for vehicles, which includes at least two chambers.

Customarily, the supply reservoirs for brake installations which consist of two or more separate circuits are so constructed that a separate chamber is provided for each circuit. Since for the most part, a low structural height has to be maintained, each of these chambers is provided with its own threaded closure means and with its own float-actuated control-contact for the indication of a predetermined filling height. Together with the common filler closure such a supply reservoir has at least three or more threaded connections whereby it becomes complicated and expensive in manufacture. Additionally, the seal of the control-contact connections entails sometimes difficulties in connection with the filling carried out under pressure in mass production.

In order to provide a less costly construction, it has been proposed already to provide in a supply reservoir at a suitable height connecting bores or a partition wall of only half the height between two respective chambers. It is to be achieved thereby that only one float-actuated control contact for the indication of the fluid level of all chambers suffices. However, this prior art proposal is unsatisfactory when the supply reservoir, as occurs for example in vehicles, assumes an inclined position in the longitudinal or traverse direction or is subjected to accelerations or decelerations in these directions. Due to the changes of the liquid level conditioned thereby, the largest portion of the fluid of a chamber is fed through the bores or above the partition wall into the other chamber so that it may happen that in case of a completely satisfactory brake installation, one brake circuit may fail due to the aspiration of air.

The difficulties become even greater if, in case of a failure of one brake circuit, the brake fluid completely runs out of a chamber. The minimum level of the fluid then establishes itself in the other chamber of the still operational brake circuit. If an inclined position of the vehicle in the longitudinal or transverse direction is now produced or an acceleration or deceleration in these directions occurs, then the fluid quantity in the still intact brake circuit is further reduced so that, beginning with a predetermined inclination or acceleration, the chamber outlet to the brake cylinder of the still intact brake circuit becomes free and the same then fails by reason of drawing-in air.

The present invention has as its task to avoid these disadvantages and to provide a supply reservoir of the aforementioned type which is as small and compact as possible and which requires only a single float-actuated control contact, yet prevents with certainty that the chamber belonging to an intact brake circuit is emptied below the permissive fluid level.

The present invention essentially consists in that respectively two adjacent chambers are connected by a pipe whose discharge openings are arranged in the chambers at such a distance from a partition wall approximately at the height of the minimum permissive fluid level that in case of an inclined position of the liquid level, one discharge opening projects out of the liquid level that establishes itself with a minimum permissive liquid level. It is attained thereby that in normal operating positions, an equalization to a common fluid level is possible so that only one float-actuated control-contact has to be provided. In case of extreme loads, in contradistinction thereto, the fluid level of each chamber cannot drop below a minimum permissive fluid level due to inclinations or accelerations.

In order to avoid that in case of inclinations about an axis parallel to the partition wall or in case of accelerations perpendicularly to the partition wall, fluid is supplied from one chamber to the other beyond the minimum permissive fluid level, provision is made according to the present invention that the perpendicular distance of the discharge openings to the partition wall is so chosen that the volume enclosed between the partition wall and a plane parallel thereto and passing through the discharge opening of the connecting pipe corresponds at least to the fluid volume which is present in a chamber in case of a minimum permissive fluid level. In order to prevent that in case of inclinations about an axis perpendicular to the partition wall or in case of accelerations in the direction of the plane of the partition wall, fluid is supplied beyond the minimum permissive level, the discharge openings are to be disposed approximately in the center between the side walls.

A particularly advantageous embodiment of the present invention which offers a sufficient safety practically in connection with all supply reservoirs, is obtained if the discharge openings are disposed above the center of the base surface of the respective chamber. It is thereby avoided with certainty that in case of a inclined position of the fluid level by reason of an inclination of the supply reservoir or by reason of accelerations, fluid is supplied if only the minimum permissive fluid level is still present in a chamber.

Since the inclined positions of the fluid level take place only for short periods of time particularly in vehicles, it may additionally be appropriate if the pipe is provided with a throttling place. It is also possible in a construction according to the present invention that all chambers be provided with a common filler connecting pipe having a float-actuated control-contact. It is thereby appropriate if an opening is provided in the upper area of the partition wall which is closed by means of a screen insert. Such an opening is appropriate for the filling of the brake fluid in new vehicles which are assembled on an assembly line.

An extraordinarily simple construction of the present invention is realized if a straight pipe is provided which is arranged at the height of the minimum permissive fluid level. In other cases, it may be advantageous if a curved pipe, especially a U-shaped, bent pipe is arranged on the bottom of the supply reservoir.

Accordingly, it is an object of the present invention to provide a supply reservoir for the brake fluid of a hydraulic brake installation which avoids by simple means the aforementioned shortcomings and drawbacks encountered in the prior art.

Another object of the present invention resides in a supply tank for the brake fluid of a hydraulic brake installation which minimizes the need for threaded connections.

A further object of the present invention resides in a supply reservoir for the brake fluid of a hydraulic brake installation which is relatively simple in construction, inexpensive in manufacture and easy to fill and assemble on assembly lines.

A still further object of the present invention resides in a brake fluid reservoir for a multi-circuit brake installation in which only a single float-actuated control-contact is necessary, yet a failure of an intact brake circuit due to transfer of brake fluid from the intact to a defective circuit is avoided.

Another object of the present invention resides in a brake fluid supply reservoir which is small in dimensions and compact in design, yet requires only a single float-actuated control-contact for its multi-circuit brake system.

These and other objects, features and advantages of the present invention will become more obvious from the following description when taken in connection with the accompanying drawing which rows, for purposes of illustration only, two embodiments in accordance with the present invention, and wherein:

FIG. 1 is a cross-sectional view through a supply reservoir for the brake fluid in accordance with the present invention; and FIG. 2 is a cross-sectional view through a modified embodiment of a supply reservoir in accordance with the present invention.

Referring now to the drawing wherein like reference numerals are used throughout the two views to designate like parts, and more particularly to FIG. 1, reference numeral 1 generally designates therein a supply reservoir or tank which is equipped with two chambers 2 and 3 which receive the brake fluid and are in operative connection by way of chamber outlets 4 and 5 with two different circuits of a brake cylinder generally designated by reference numeral 6, whereby one brake piston 9 and 10, respectively, is provided for each brake circuit 7 and 8. The present invention makes it possible to equip the supply reservoir 1 with only one threaded connection generally designated by reference numeral 11 which serves both for the filling of the brake fluid as also for the accommodation and mounting of a control-contact of conventional construction (not shown) actuated by a float 12.

The two chambers 2 and 3 are separated from one another by a partition wall 13. However, they are in communication with each other by way of a pipe 14 which is arranged horizontally at the height of the minimum permissive fluid level indicated by "min.". The pipe 14 extends into each of the chambers 2 and 3 for such a distance that the volume enclosed between the partition wall 13 and the planes extending through the discharge openings 15 and 16 and disposed parallel to the partition wall 13 corresponds at least to the volume of the brake fluid present in case of minimum permissive fluid level in a chamber 2 or 3. It is attained thereby that in case of an inclined position of the fluid level relative to the reservoir tank bottom, i.e., if the supply reservoir 1 is inclined about an axis disposed parallel to the partition wall 13, for example, in the clockwise direction, the left pipe end with its discharge opening 15 is lifted and projects out of the fluid level if only the minimum permissive fluid level is still present in the chamber 3. The same is true for the discharge opening 16 in case of an inclination of the supply reservoir 1 about an axis parallel to the partition wall 13 and in a counterclockwise direction.

The pipe 14 is arranged in the center between the front wall and the rear wall of the supply reservoir 1 so that in case of inclinations about an axis perpendicular to the partition wall 13, or in case of accelerations in the direction of the partition wall 13, the fluid level does not change within the area of the discharge apertures 15 and 16.

In order to be able to fill brake fluid into the supply reservoir 1 as rapidly as possible, as is necessary in particular in mass production of motor vehicles on assembly lines, an aperture 17 is provided in the upper area of the partition wall 13. This opening 17 is closed after the first filling of the brake fluid by a means of a screen-like insert 18 which is provided only in its upper area with a vent opening 19 for the chamber 2.

In the embodiment according to FIG. 2, the supply reservoir 1 is constructed in a similar manner as in the embodiment according to FIG. 1. It differs only by the particular construction of the pipe 20 connecting the chambers 2 and 3 which has a U-shaped configuration and is arranged at the bottom 21 of the supply reservoir 1. The U-shaped pipe 20 includes discharge openings 22 and 23 which are disposed in the chambers 2 and 2 of the supply reservoir 1 in a manner similar to the discharge openings 15 and 16 of the pipe 14. Hence, the same effects are produced as in the embodiment according to FIG. 1 whereby the pipe may be arranged with any desired inclination.

Also in this embodiment, the partition wall 13 is provided with an aperture 17 which is closed after the filling of the brake fluid by a screen-like insert (not shown in FIG. 2) which is constructed as a pipe portion.

It is possible by the present invention to increase the number of chambers and therewith the number of the brake circuits with an approximately horizontal arrangement of the chambers and with a connection of respectively two adjacent chambers by means of a pipe 14 or 20.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A supply reservoir for the brake fluid of a hydraulic brake system which includes at least two chamber means separated by a partition wall means, characterized in that two adjacent chamber means are connected with each other by a pipe means whose discharge openings are arranged approximately at the height of the minimum permissive fluid level within the chamber means at such a distance from the partition wall means that in case of a inclination of the fluid level, one discharge opening projects out of the fluid level which is established in case of a minimum permissive fluid level.

2. A supply reservoir according to claim 1, characterized in that the distance of the discharge openings to the partition wall means is so chosen that the volume enclosed by the partition wall means and a plane disposed substantially parallel thereto and passing through a respective discharge opening corresponds at least to the fluid volume present during minimum permissive fluid levels in a respective chamber means.

3. A supply reservoir with side walls according to claim 1, characterized in that the discharge openings are disposed approximately in the center between the side walls.

4. A supply reservoir according to claim 1, characterized in that the discharge openings are disposed approximately above the center of the base surface of a respective chamber means.

5. A supply reservoir according to claim 1, characterized in that the pipe means includes a throttling means.

6. A supply reservoir according to claim 1, characterized by a common filler connecting means with a single float-actuated control contact for all chamber means.

7. A supply reservoir according to claim 6, characterized in that an aperture is provided in the upper area of the partition wall means which is closed by a screen insert.

8. A supply reservoir according to claim 7, characterized in that a substantially rectilinear pipe means is provided which is arranged at the height of the minimum permissive fluid level.

9. A supply reservoir according to claim 1, characterized in that an aperture is provided in the upper area of the partition wall means which is closed by a screen insert.

10. A supply reservoir according to claim 1, characterized in that a substantially rectilinear pipe means is provided which is arranged at the height of the minimum permissive fluid level.

11. A supply reservoir according to claim 1, characterized in that a curved pipe means is provided which is arranged on the bottom of the supply reservoir.

12. A supply reservoir according to claim 11, characterized in that said curved pipe means has a substantially U-shape.

13. A supply reservoir for brake fluid of a hydraulic brake system comprising a plurality of chamber means for containing brake fluid; partition wall means for separating adjacent chamber means; and pipe means, having discharge openings disposed substantially at the level of the minimum allowable fluid level in said chamber means, for connecting adjacent chamber means, said pipe means having the discharge openings disposed at a distance from the partition wall means whereby during inclinations of the fluid level at least one discharge opening projects from the minimum allowable fluid level in the associated chamber means.

14. A fluid supply reservoir according to claim 13, wherein the discharge openings of said pipe means are disposed at a distance from said partition wall means such that the volume enclosed by said partition wall means and a plane disposed substantially parallel thereto and passing through a respective discharge opening corresponds to at least the fluid volume of the minimum allowable fluid level in a respective chamber means.

15. A fluid supply reservoir according to claim 13, wherein the pipe means includes a throttling means.

16. A fluid supply reservoir according to claim 13, further comprising side walls for each chamber means wherein said discharge openings are disposed approximately centrally between the side walls.

17. A fluid supply reservoir according to claim 13, wherein the discharge openings are disposed approximately above the center of the base surface of a respective chamber means.

18. A fluid supply reservoir according to claim 13, further comprising connecting means attached to an upper surface of said reservoir for permitting said chamber means to be commonly filled with fluid, and a single float-actuated control switch operatively connected to said connecting means for indicating a predetermined fluid level.

19. A fluid supply reservoir according to claim 13, wherein said partition wall means includes an aperture in an upper portion of said partition wall means, said aperture being closed by a screen insert.

20. A fluid supply reservoir according to claim 13, wherein said pipe means is a substantially rectilinear pipe means disposed substantially at the level of the minimum allowable fluid level in said chamber means.

21. A fluid supply reservoir according to claim 13, wherein said pipe means is formed of curved pipe means having a middle section disposed on the base surface of the reservoir, and said discharge openings are disposed upwardly.

22. A fluid supply reservoir according to claim 18, wherein said curved pipe means is substantially U-shaped.

* * * * *